US007275262B1

(12) United States Patent
Habert

(10) Patent No.: US 7,275,262 B1
(45) Date of Patent: Sep. 25, 2007

(54) METHOD AND SYSTEM ARCHITECTURE FOR SECURE COMMUNICATION BETWEEN TWO ENTITIES CONNECTED TO AN INTERNET NETWORK COMPRISING A WIRELESS TRANSMISSION SEGMENT

(75) Inventor: Michel Habert, Saint Egreve (FR)

(73) Assignee: Bull S.A., Louveciennes (FR)

( * ) Notice: Subject to any disclaimer, the term of this patent is extended or adjusted under 35 U.S.C. 154(b) by 0 days.

(21) Appl. No.: 10/048,057

(22) PCT Filed: May 22, 2000

(86) PCT No.: PCT/FR01/01564

§ 371 (c)(1),
(2), (4) Date: Jan. 25, 2002

(30) Foreign Application Priority Data

May 25, 2000 (FR) ................................. 00 06693

(51) Int. Cl.
*G06F 7/06* (2006.01)
*H04L 9/00* (2006.01)
(52) U.S. Cl. ................... 726/26; 713/153; 713/168
(58) Field of Classification Search .............. 713/201, 713/153, 168; 726/14, 26
See application file for complete search history.

(56) References Cited

U.S. PATENT DOCUMENTS

| 6,278,697 | B1 * | 8/2001 | Brody et al. ............... 370/310 |
| 6,356,529 | B1 * | 3/2002 | Zarom |
| 6,609,150 | B2 * | 8/2003 | Lee |
| 6,675,219 | B1 * | 1/2004 | Leppinen et al. |
| 6,708,219 | B1 * | 3/2004 | Borella et al. ............. 709/245 |
| 6,763,247 | B1 * | 7/2004 | Hollstrom et al. |
| 6,850,766 | B2 * | 2/2005 | Lau et al. |
| 6,901,067 | B1 * | 5/2005 | Kalavade |
| 2002/0001295 | A1 * | 1/2002 | Park .......................... 370/338 |
| 2002/0022488 | A1 * | 2/2002 | Srinivasan et al. ......... 455/456 |

(Continued)

OTHER PUBLICATIONS

W. Stallings: "Cryptography and Network Security, Principles And Practice, 2nd edition." 1999, Prentice-Hall, US XP002167283.*

(Continued)

*Primary Examiner*—Nasser Moazzami
*Assistant Examiner*—Eleni Shiferaw
(74) *Attorney, Agent, or Firm*—Miles & Stockbridge, P.C.; Edward J. Kondracki

(57) ABSTRACT

A method for providing secure communication between first and second systems connected to the internet includes assigning respective permanent internet addresses to first and second entities associated with the systems, making at least one application located in a server of said second system accessible to the first entity, and encrypting data exchanged between the first and second entities in conformity with a desired security protocol. The first and second systems each include a communication protocol stack having at least one layer which allows for the encrypting step to be performed. Through this method, a user in the first system can directly address an application hosted by the second system without using or even knowing the name of the host system. The entity in the first system may be a wireless unit operating, for example, in GSM and the entity in the second system may be a server in an intranet. To enable conversion to take place between the wireless application and internet standards, the server in the second system is preferably equipped with WAP and WEB servers and associated conversion units.

18 Claims, 6 Drawing Sheets

U.S. PATENT DOCUMENTS

| | | | |
|---|---|---|---|
| 2002/0023209 A1* | 2/2002 | Domstedt et al. | 713/160 |
| 2002/0075844 A1* | 6/2002 | Hagen | 370/351 |
| 2002/0099854 A1* | 7/2002 | Jorgensen | 709/249 |
| 2002/0146018 A1* | 10/2002 | Kailamaki et al. | 370/401 |
| 2002/0169953 A1* | 11/2002 | Moharram et al. | 713/151 |
| 2003/0073426 A1* | 4/2003 | Chan et al. | 455/406 |
| 2003/0169730 A1* | 9/2003 | Narasimhan et al. | 370/355 |
| 2003/0177397 A1* | 9/2003 | Samman | 713/201 |
| 2003/0182431 A1* | 9/2003 | Sturniolo et al. | 709/227 |

OTHER PUBLICATIONS

WAP forum "WAP-195-WAEOverview; version Mar. 29, 2000".*

XP 000623747, Stallings W. "IPV6: The New Internet Protocol", IEEE Communications Magazine, vol. 34, No. 7, dated Jul. 1996, pp. 96-108.

XP-002155622, "WAP-195-WAEOverview", Version 29—Mar. 2000.

XP-002167283, W. Stallings, "Cryptography and Network Security, Principles and Practice, 2nd Edition" 1999.

* cited by examiner

METHOD AND SYSTEM ARCHITECTURE FOR SECURE COMMUNICATION BETWEEN TWO ENTITIES CONNECTED TO AN INTERNET NETWORK COMPRISING A WIRELESS TRANSMISSION SEGMENT

BACKGROUND OF THE INVENTION

1. Field of the Invention

The invention concerns a method for secure communication between two entities connected to an internet network.

It applies more specifically to communications via an internet network comprising a wireless transmission segment.

The invention also concerns an architecture of a communication system for implementing this method.

Within the context of the invention, the term "entity" should be understood in its most general sense. It includes both hardware or software computer resources and, according to a characteristic of the invention that will be explained below, human beings, using any of the components of the communication system.

The term "internet" should also be understood in its most general sense. It includes, in addition to the Internet per se, private enterprise or similar networks, known as "intranets," and the networks that extend them to the outside, known as "extranets," and generally any network in which data is exchanged using an Internet protocol. However, to illustrate the concepts without in any way limiting the scope of the invention, hereinafter we will consider the case of the Internet per se, unless otherwise indicated.

2. Description of the Related Art

Normally, communications in networks of any nature take place in conformity with protocols that conform to standards comprising several superposed software layers.

The architecture of communication networks is described by various logical layers. For example, the "OSI" ("Open Systems Interconnection") standard defined by the "ISO" comprises seven layers, which run from the so-called lower layers (for example the so-called "physical" layer that supports physical transmission) to the so-called upper layers (for example the so-called "application" layer), passing through intermediate layers, including the so-called "transport" layer. A data layer offers its services to the layer that is immediately above it and requests other services from the layer immediately below it, via appropriate interfaces. The layers communicate by means of primitives. They can also communicate with layers on the same level. In certain architectures, one of these layers or another may be nonexistent.

In the case of an internet network, communications take place in conformity with protocols that are specific to this type of communication, but that also comprise several software layers. There are five layers, and more precisely, going from the top layer to the bottom layer: the application layer (HTTP, "ftp", "e-mail", etc.), the transport layer ("TCP"), the network address layer ("IP"), the data link layer ("PPP", "Slip", etc.) and the physical layer. The communication protocol is chosen based on the application specifically envisioned: interrogation of "web" pages (HTTP), file transfers ("FTP"), electronic mail (or "e-mail"), forums or "news," etc.

Overall, an internet network comprises, to begin with, one or more actual data transmission networks, possibly divided into sub-networks. These networks specifically include channels of physical links, which constitute the lowest level. Communications can be handled by relatively low-speed links i.e., telephone links, or high or very high-speed links i.e., fiber optics, microwave systems, or satellite links, particularly for the backbone routes. Various systems, subsystems, machines and/or terminals are connected to this network or networks. The connection may be direct (using a modem, for example) or indirect, through a so-called "fire-wall" system, a "proxy", or through the computer system of an Internet service provider (or "ISP").

The range of connected entities, in the prior art, can run from large-scale computers (for example of the so-called "main-frame" type) to so-called "low power" terminals, i.e. having few computer resources of their own, for example dedicated terminals, or even simple smart card reading terminals. These entities, which may be referred to generically as "systems," have an operating system (or "OS"), which may or may not be proprietary. For example, there is the "UNIX" (registered trademark) operating system, frequently used in connection with applications related to the Internet.

Generally, communications between connected entities take place in a so-called client-server mode and implement the so-called object-oriented technology. A server may be defined as being a software program, an application or any software entity that renders a given service (for example the transfer of a requested file). Such an entity is hosted by systems connected to the Internet, which are called "servers". A "client" entity may be defined as being the counterpart of the "server" entity, i.e., the entity requesting a given service. However, there is nothing to prevent a system or an application from being both "client" and "server."

As indicated above, one of the software communication layers is constituted by the so-called "IP" address layer. It is in fact necessary for a client, for example, to be able to selectively address a server, via the Internet. For this reason, Internet technology implements the concept known as a "URL" (for "Uniform Resource Locator"), which uses an address known as an "IP" (for "Internet Protocol") address. The Internet is organized very hierarchically into domains and subdomains, which themselves correspond to networks and subnetworks, managed by electronic directory systems called "DNS" (for "Domain Name Servers"). The structure of the IP address reflects this hierarchical organization. It comprises an IP address per se, itself comprising a destination subnetwork address and an address of an entity within this subnetwork. It is associated with a port number that makes it possible to address a server inside the aforementioned entity.

For a single entity connected to the Internet, the IP addresses can be permanent or can vary over time. For example, systems connected to the Internet via a service provider are generally assigned a different address at the start of each session.

Recently, a certain number of needs have arisen.

A first need has to do with mobility. Users may be said to be "mobile."These users have mobile terminals, such as portable microcomputers, and they want to be able to connect at any point in the network without excessive restrictions. In particular, migration from one domain to another should be transparent for the user. He should also be able to preserve his usual environment, for example to retain access to a list of services to which he has subscribed, for free or otherwise, to an address list, etc. The data that characterize this environment can be stored in a remote server that the subscriber can access. He can also transport them with him, for example in the memory of a smart card.

More recently, it has been proposed to connect mobile telephones, either alone or in combination with organizer type devices or the like, directly to the Internet. This connection takes place physically via a wireless transmission network, such as the network in the "Global System for Mobile communications" ("GSM") standard. This network is itself connected to the Internet via specialized "gateways."

This arrangement is very advantageous, because it allows for extreme mobility. It is no longer necessary to use fixed points to connect to the Internet. A priori, the only limit on this mobility results from the extent of the territorial coverage of a given operator's "GSM" network.

However, there are other types of limitations due to this mode of transmission.

A first limitation is related to bandwidth In the current state of the art, the transmission speed is very low: 9600 bps. Even in the case of a simple conventional wired telephone line, the V90 standard, for example, makes it possible to obtain a maximum speed of 56000 bps. It is possible to obtain much higher speeds if using ADSL technology (470 kbps to 1 Mbps). In addition, links of the RNIS type by cable or satellite allow high or very high speeds. New technologies are currently being developed or installed, such as GPRS ("Global Packet Radio Service") or UTMS ("Universal Mobile Telecommunication Service") and will allow higher transmission speeds, but they are not yet fully operational. At the very least, the GSM network in its current version will last for an indeterminate amount of time, since modifications and/or complete changes of equipment will be necessary, particularly for the so-called "G3" version of GSM.

A second limitation, a consequence of the miniaturization of wireless communication devices, is due to the reduced, and often extremely reduced, area of the display screens of these devices.

It follows that Internet protocols, especially where the web itself is concerned (HTTP protocol) are not well adapted. In particular, the language currently used for these applications is an interpreted page description language called HTML ("Hyper Text Markup Language"); this language is not suitable for the aforementioned types of screens.

Also, a new protocol has been proposed, derived from Internet protocols of the proprietary type known as WAP, for "Wireless Application Protocol". This protocol allows mobile telephones to access e-mail, web or multimedia (video for example) applications, while adapting to the specific characteristics of these devices and of the communication network to which they are connected, (for example the GSM network).

Although it allows access to the above applications, this solution is not without its drawbacks.

The Internet sites must be adapted, since it is not possible to display on the screen of a mobile telephone, which moreover is usually monochrome, what can be displayed on a screen of larger dimensions and higher definition, like that of a microcomputer. A specific language has been developed for these uses: WML ("WAP Markup Language"). It is therefore necessary to use a specific browser.

Most of the services offered by telephony operators using WAP technology concern services for accessing stock market quotations, weather reports, schedules for trains or other means of transport, schedules for various shows, etc., or for displaying simple videograms or games that are not very resource-hungry.

However, using this solution for e-commerce or banking applications, for example, poses problems with respect to security, as will be shown below.

In fact, another need that has arisen in many fields of application is the level of security offered by the system during transmissions between two entities.

In the context of the invention, the term "security" should be understood in a general sense. It concerns, first of all, confidentiality: certain data are said to be sensitive, and should not be able to be accessed by unauthorized entities, whether they be physical persons or software applications. For this reason, various encryption techniques are commonly used. Security also concerns the problems of authentication between parties, which are even more acute when these parties can be mobile on the Internet. Authentication can be achieved by means of identification data (passwords) and/or by using the so-called certificate technique, in association with encryption keys, for example stored in a smart card. Security also concerns anything having to do with the integrity of the data transmitted. It must be possible to ensure that the data received has not been subject to undesirable modifications, whether accidental (failure of transmission circuits, for example) or intentional (maliciousness, etc.). To do this, redundancy techniques and/or electronic signature techniques (integrity locking) can be implemented.

For the "conventional" internet network, one of the most commonly used security techniques uses the technology known as SSL/TLS ("Secure Socket Layer/Transport Layer Security"). However, this technology provides only a minimal level of security. A higher level, already made mandatory by the so-called "IPV6" version of the Internet protocols (i.e., version 6, the version used currently being primarily version 4 or "IPV4"), is provided by the security protocol known as "IPSec". It provides a standardized level of security that allows end-to-end protection, at the network level.

In the case of WAP technology, a security layer having a functionality similar to the aforementioned SSL/TLS layer has been proposed, which can be used for wireless transmissions and is known as WTLS ("Wireless Transport Layer Security"). This technology, which is optional, adds a substantial level of complexity and does not offer a high level of security. Also, since as mentioned, the majority of the services offered do not require any particular security measures, the operators of telephone networks are not very inclined to implement it.

Moreover, and above all, as indicated, there is generally a gateway that serves as the interface between the Internet and the wireless transmission network.

FIG. 1, located at the end of the present specification, schematically illustrates an architecture, according to the prior art, of a communication system 1 between a user $U_1$ equipped with a mobile terminal of the WAP type 10 (for example a mobile telephone), connected to a radio transmission network RTT (for example in the GSM or GPRS standard), and a computer device 12, connected to the Internet RI, for example a remote server. The mobile terminal 10 has the role of a client vis-à-vis the server 12. The network RTT forms the "aerial" segment of the mobile communication network, a segment linked to a second segment RT, called a PLM ("Public Land Mobile Network"), via transmitting/receiving beacons (not represented) that define cells.

This technology is well known to one skilled in the art and does not need to be described further. For a non-limiting example, it may be beneficial to refer to the article by Jean CELLMER entitled "Réseaux cellulaires, Système GSM" in "Techniques de l'Ingénieur", Volume TE 7364, November 1999, pages 1 through 23.

The Internet RI is interconnected with the segment RT.

The land and aerial RTT segments are interconnected by a gateway 11. Within the context of WAP technology, this gateway 11 generally plays the role of an interface that allows two-way WAP conversions to or from HTTP. It specifically comprises a WAP protocol logical layer 110a, and an HTTP protocol logical layer 111a, supplemented by an SLL/TLS security layer 111b on the HTTP end, and a WTLS security layer 110b (optional) on the WAP end.

Lastly, the gateway 11 comprises an interface 113 between the two series of logical layers for performing the aforementioned two-way conversion. To be precise, this interface 113 between the SSL/TLS 111b and WTSL 110b security protocols introduces a security loophole, thus creating a non-secure area that makes the so-called "WAP gateway" concept just described practically incompatible with e-commerce and banking applications, and in general, with any so-called sensitive application requiring a high level of security.

On the other hand, looking at a workstation 13, or any similar device under the control of a user $U_2$, connected directly to the Internet RI, the communication protocols used between this workstation 13 and the server 12 are homogeneous. There is no security loophole intrinsic to the system. The same would be true if the workstation 13 were connected to the server 12 via an intranet or an extranet.

SUMMARY OF THE INVENTION

The object of the invention is to meet the needs that have arisen for communications via an internet network, whether it be a conventional type of network or a network using WAP technology, while eliminating the drawbacks of the devices of the prior art, some of which have been mentioned.

To do this, according to a first characteristic, the aforementioned so-called "WAP gateway" concept is entirely eliminated, which makes it possible to eliminate the security loophole found at the level of the WEB/WAP interface. The WAP/WEB conversion is performed directly at the server level.

According to a second characteristic, each of the entities that must be placed in communication is assigned a so-called permanent address.

According to another characteristic, an end-to-end security mechanism is adopted at the network level, which can be used for any Internet, web, WAP, or other type of application, and which is programmed declaratively, thus providing complete transparency.

Because of this transparency, one of the advantageous consequences of the method according to the invention is that it is not necessary to re-write existing applications in order to protect them with this technique.

In a preferred variant of embodiment of the invention, the mechanism adopted is the aforementioned IPSec protocol.

While the method according to the invention is particularly advantageous when one of the segments of the communication network is constituted by a wireless communication network involving the utilization of WAP technology, it should be clear that it also applies to a homogeneous internet network.

Hence, the main subject of the invention is a method for secure communication between first and second entities interconnected via an internet network, said entities being associated with first and second computer data processing systems within a set of distributed systems connected to said internet network, characterized in that said first and second entities are constituted by a piece of software hosted in one of said systems connected to said internet network and/or a user of said connected systems, in that said first system operates in the so-called client mode and said second system operates in the so-called server mode, in that it includes a step for assigning, in said set of systems, a permanent Internet address of the so-called IP type to each of said interconnected entities, in that installed in said second system forming the server is at least one piece of software forming a server and offering the services of at least one application to said first entity, and in that installed in said first and second systems is a communication protocol stack that includes at least one layer for the execution of a step for encrypting, in end-to-end mode in conformity with a given security protocol, data exchanged between said interconnected entities.

Another subject of the invention is a communication architecture in a set of distributed systems for implementing the method.

BRIEF DESCRIPTION OF THE DRAWINGS

The invention will now be described in greater detail in reference to the attached drawings, in which.

DESCRIPTION OF THE PREFERRED EMBODIMENTS

Hereinafter, without in any way limiting the scope of the invention, we will stay within the context of the preferred application of the invention unless otherwise indicated, i.e., within the context of a so-called hybrid communication system comprising an internet network, and possibly an intranet, and a mobile communication network comprising an aerial segment and using WAP technology.

Figure 2:
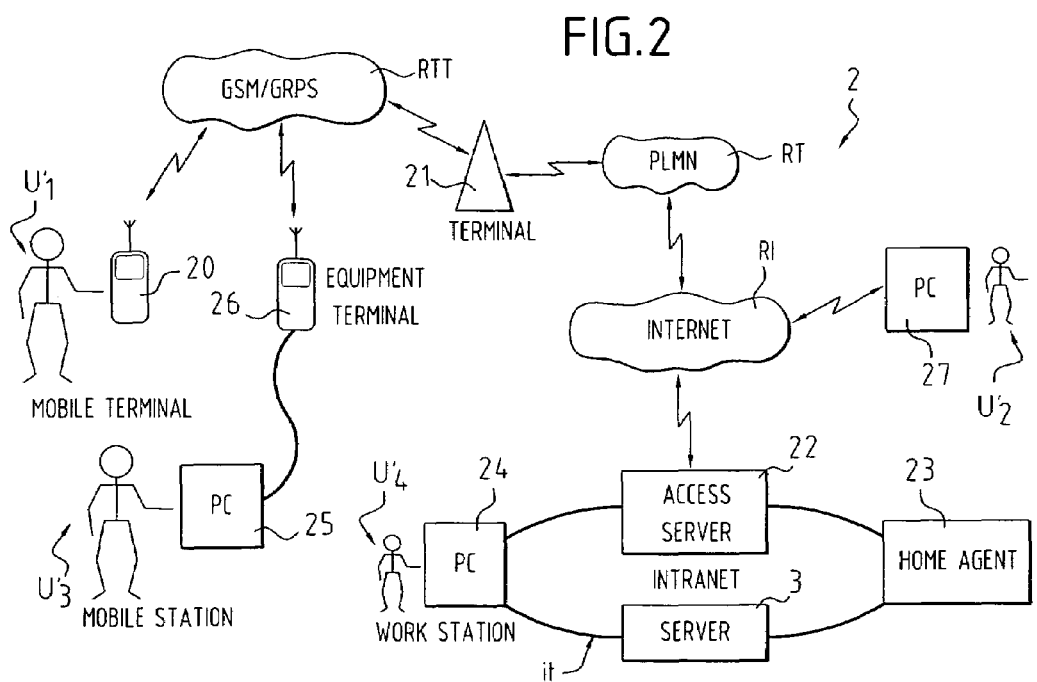
FIG. 2 schematically illustrates an exemplary architecture of a system for communication via an internet network and a wireless communication network using WAP technology, according to a preferred embodiment of the invention.

FIG. 2 schematically illustrates an exemplary system architecture, hereinafter referenced 2, for implementing the method according to the invention. The elements in common with the preceding figure have the same references, and will be re-described only as necessary.

The system 2 of the example in FIG. 2, considered as a whole, comprises, to begin with, a mobile terminal 20, under the control of a user $U'_1$ (playing a role similar to the terminal 10 of FIG. 1), and a mobile station 25, under the control of a user $U'_3$, both of which are connected to the radio transmission network RTT. The terminal 20, assumed to be a mobile telephone, is connected directly to the network RTT.

The mobile station 25, for example a microcomputer, is connected to this network RTT via a terminal 26, which can also be constituted by a mobile telephone. The latter is connected to the mobile station 25 via a serial link or an infrared link, for example.

As above, the network RTT is connected to the land network RT via a gateway 21. However, the latter no longer plays the role of a WAP-HTTP conversion interface (the aforementioned "WAP gateway"), according to one of the aspects of the invention. It makes it possible, in an intrinsically conventional way, to perform the electrical and logical conversions required to switch from a land-based data transmission mode to a radio transmission mode, for example in the GSM standard.

The land-based network RT is connected to the Internet RI, the latter, in the example of FIG. 2, being connected to an intranet it, via an access server 22. A server 3 is connected to the intranet it.

Figure 1:
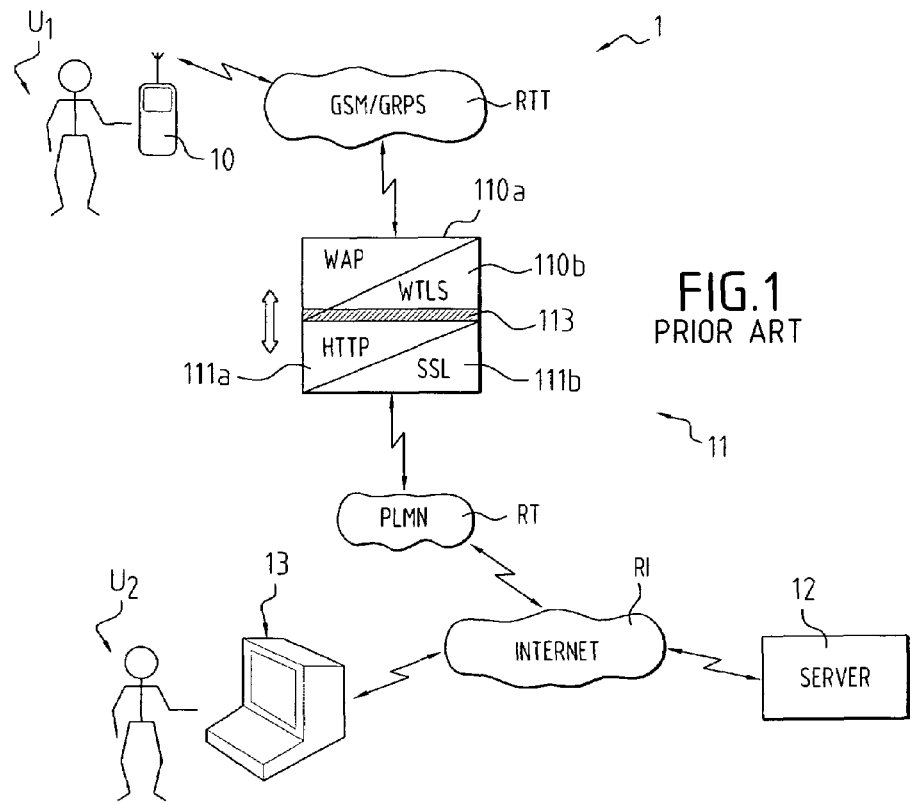
FIG. 1 schematically illustrates an exemplary embodiment of a communication system according to the prior art, comprising an internet network and a wireless communication network using WAP technology.

Also represented is a workstation 24 connected to the intranet it, for example a microcomputer under the control of a user $U'_4$, and a second workstation 27 connected directly to the Internet RI, for example a microcomputer under the control of a user $U'_2$ (playing a role similar to station 13 in FIG. 1).

In reality, a much larger number of users is connected to the networks of the system 2, via various types of machines or systems. However, the system 2 of FIG. 2 makes it possible to illustrate the main types of devices encountered in networks in which the standard Internet protocols and WAP coexist. It is also possible to provide so-called "firewall" systems (not represented), for example included in the access server 22, which isolate the intranet it from the outside world, i.e. from the Internet RI.

According to one characteristic, also intrinsically common to the prior art, all or some of the connected machines or systems can be mobile on the network. The other users must be able to transparently address the machines that have migrated. Also, at least in the aforementioned IPV6 version, a device 23, generally known as a "Home agent", is provided, in this case connected to the intranet it, thus making it possible to handle this mobility. To do this, a protocol called "Mobile IP" is used. It makes it possible to correlate a temporary address assigned to a connected system with a permanent address assigned to the entity that is associated with it. A user wishing to address the mobile system always manipulates only this permanent address. The aforementioned Mobile IP protocol makes it possible to provide macromobility. This is the case, for example, when one changes GPRS network operators.

This set constitutes a distributed system.

Up to this point, except for the structure of the gateway 21, which no longer serves as an interface between the WAP and HTTP protocols, the general architecture of the system 2 just described is intrinsically common to an architecture according to the prior art (like that of FIG. 1).

Figure 3:
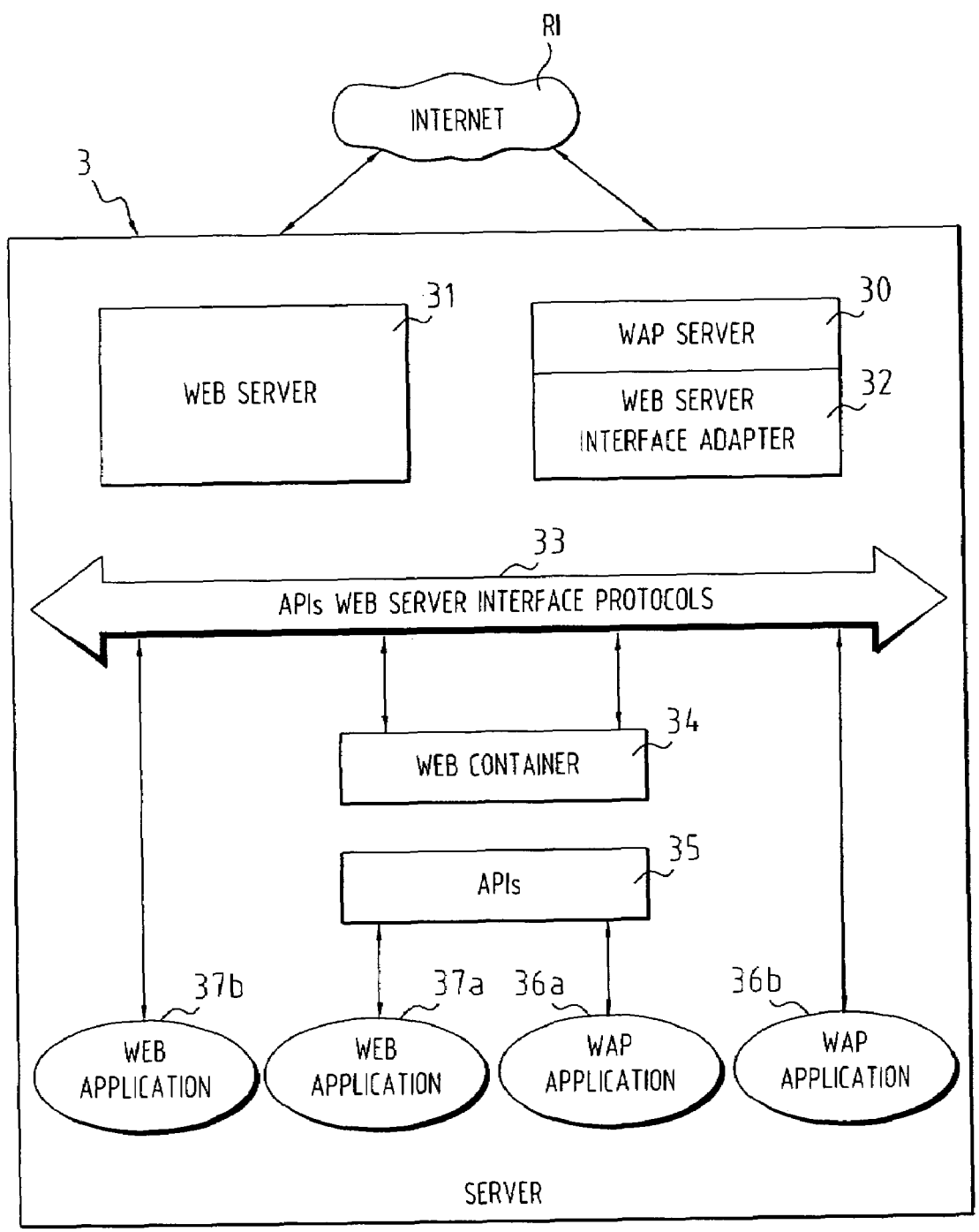
FIGS. 3 and 4 illustrates two variants of the configuration of a server system according to the invention.

According to a first characteristic specific to the invention, which will be described in connection with FIGS. 3 and 4, the architecture of the servers 3 is modified in such a way that conversions to the application interface protocols of the web servers are performed inside the latter, and no longer at the level of the gateway 21, in the form of WAP/HTTP communication protocol conversions. The server 3 therefore hosts a WAP gateway with a web server application interface adapter. This modification allows an end-to-end protection of the transmissions that is transparent vis-à-vis the protocols used, be they HHTP, WAP or other protocols (transmissions in data packet mode), and that no longer has a security loophole as in the prior art, by eliminating the WAP gateway function. Lastly, it makes it possible not to use the WTLS security protocol, which is complex to implement and offers only a low level of security. In FIG. 3, it is assumed that the server 3 comprises both WAP applications, with the references 36a and 36b, and web applications, with the references 37a and 37b. According to one of the aspects of the invention, a dedicated WAP server 30 and a dedicated web server 31 are also provided, installed in the server 3. These two servers 30 and 31, are capable of selectively recognizing requests in the WAP protocol and those in the web protocol, respectively. This selection is made via the particular configurations of the received messages belonging to either of these protocols. The requests are received directly from the Internet RI, or indirectly through an intranet ii (FIG. 2), via conventional elements (not represented) such as a modem, etc., and standardized communication layers (also not represented).

According to a first variant of the invention, illustrated by FIG. 3, a module 32 is interposed between the WAP server 30 and "APIs," or application interface protocols, of the web server type 33. This module 32, which can be constituted by a piece of software, is an interface adapter that allows the methods for accessing WAP applications to be the same as the methods for accessing web applications with web servers.

The applications 36a-36b and 37a-37b can be constituted by pages written in the WLM et HTML languages, respectively.

As is well known, a certain number of techniques are used to write web applications in "web server DOS". These APIs can be the types known as "CGI" (for "Common Gate Interface," which constitutes a gateway), "NSAPI" (for Netscape Server API—registered trademark) or "ISAPI" (for Internet Server API). The application 37b is of this type and is therefore interconnected directly with the module 33. More recently, so-called "container" APIs have been proposed, which constitute engines known as "Servlets" (registered trademark). The application 37a is of this type and is interconnected with the module 33 via a module known as a "Web Container" 34 and specific APIs 35. For example, there is "Tomcat," for servers of the "Apache" type in the "Linux" operating system (all of these terms are registered trademarks).

According to the advantageous characteristic of the invention just described, the WAP server 30 has an interface adapter 32 that allows applications written for WAP servers 30 to use both series of standard mechanisms mentioned above: the WAP applications 36b et 36a respectively.

Figure 4:
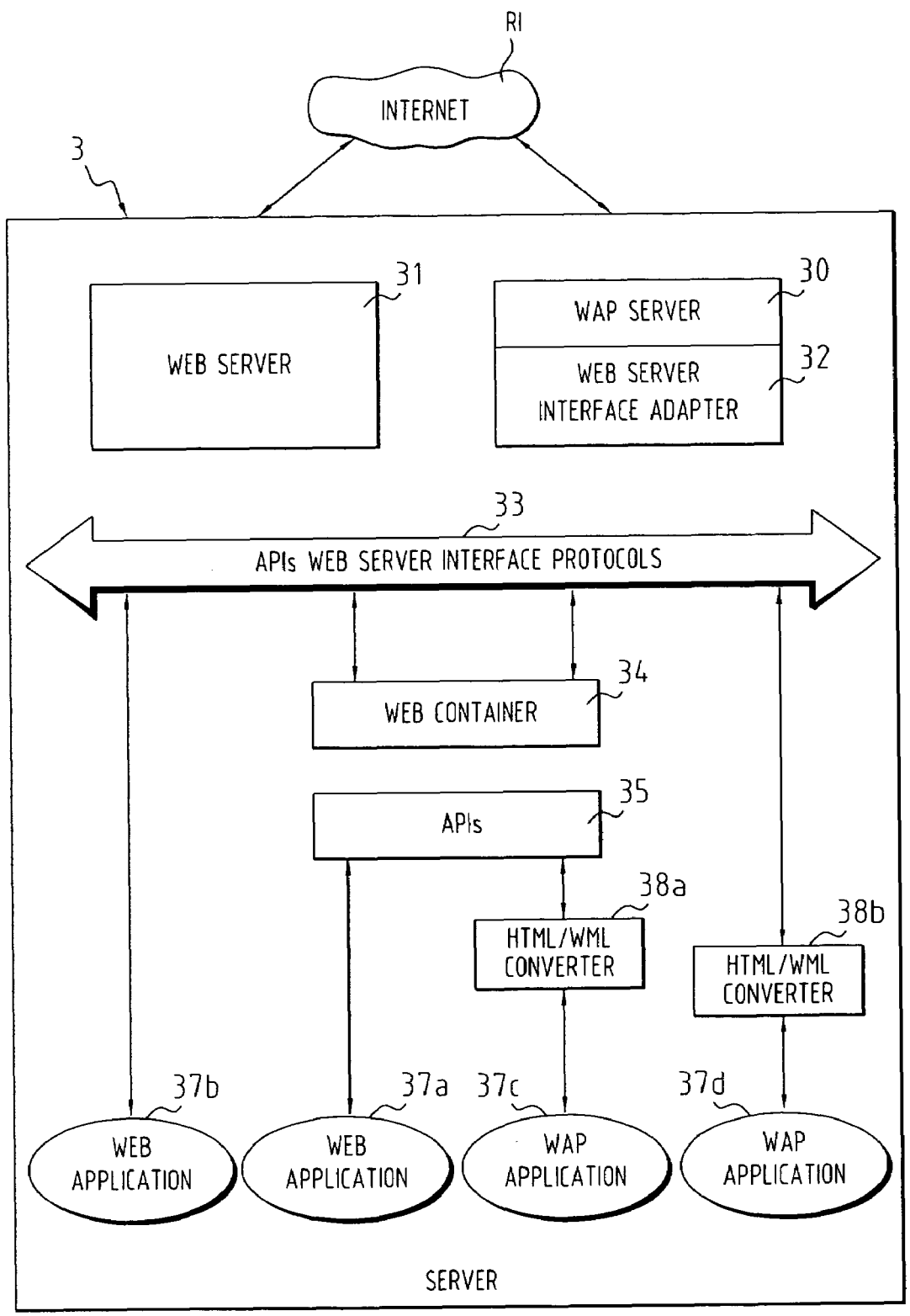

A second variant of embodiment of the invention is illustrated by FIG. 4. The server, here referenced 3', comprises, as before, a WAP server 30 and a web server 31, as well as the interface adapter module 32. However, the applications present in the server 3' are solely web type applications, referenced 37a and 37d, a priori written in HTML language. The web applications 37a and 37b correspond to the web applications with the same references in FIG. 3, the applications 37c and 37d being substituted for the WAP applications 36a and 36b, respectively. Additional modules 38a and 38b are inserted between the modules 33 and 34-35 and the applications 38a and 38b. The function devolved to these modules 38a and 38b is a two-way conversion between the HTML and WML languages. Because of this, requests coming from the WAP server 30 are transmitted via the modules 33 or 34-35 to the converters 38a or 38b, then to one of the web applications 37c or 37d. On the other hand, requests coming from the web server 31 are transmitted directly from the modules 33 or 34-35 to the web applications 37a or 37b. The reverse routing is also true. According to another characteristic of the method of the invention, a pennanent address is assigned to the users or client applications (for example $U_1$ through $U_4$, FIG. 2), and to the server applications (for example 36a-36b and/or 37a-37, FIG. 3 or 4). Generally, a permanent address is assigned to entities that must be connected. This assigning can be done dynamically.

In the current internet networks, it is not possible to directly address an application inside a system. In general, clients that address a remote entity managed by a system, service or application, invoke a name service. The latter requires the name of the network and the address of the system that contains the entity to be reached.

Also, the Applicant has proposed, in the French patent application published as FR 2 773 428 A1, a method that specifically makes it possible to directly address a software application hosted by a system connected to an internet network. This method will be briefly summarized below in reference to FIGS. 5 and 6.

Figure 5:
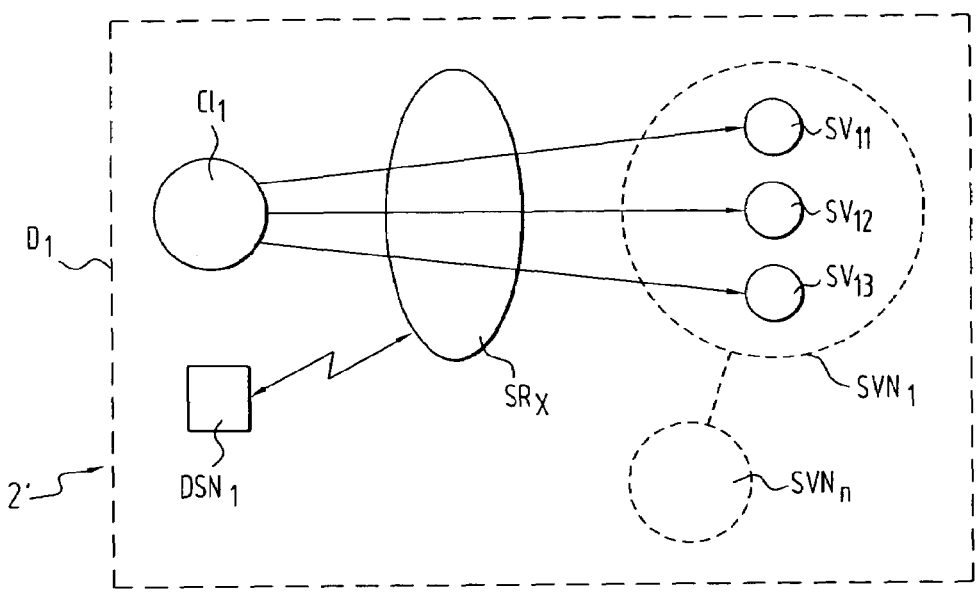
FIGS. 5 and 6 illustrate a system architecture for directly addressing a software application hosted by a system.

This FIG. 5 schematically illustrates the method for addressing servers according to this patent application. For purposes of simplification, it has been assumed that the set of systems referenced 2' is contained in single domain $D_1$, associated with a domain name server $DNS_1$. Also for purposes of simplification, only one client $Cl_1$ has been represented. This could be, for example, the workstation 27 of FIG. 2. According to one of the characteristics of the addressing method, each real system (for example the servers 3 or 3' in FIGS. 3 and 4) is comparable to a virtual network, referenced $SVN_1$ through $SVN_n$, represented by broken lines in FIG. 5, arbitrarily called "system virtual networks."

According to a second characteristic of the addressing method, the servers, for example $SV_{11}$ through $SV_{13}$ in the system virtual network are each associated with an individual IP address. It follows that each server, for example the server $SV_{11}$, i.e., an object or a software entity, is directly addressable by a client, for example the client $Cl_1$, and more generally, a client $Cl_X$ if the system 2' includes several clients (x being arbitrary). In other words, a client no longer needs to know the name of the system hosting the desired server. The directory of the server $DNS_1$ stores all the IP addresses of the servers, for example of the servers $SV_{11}$ through $SV_{13}$ of the system virtual network.

It should be noted that, in a multidomain system, all the servers of a system virtual network belong to the same domain.

According to a third characteristic of the addressing method, the "real" systems or machines, which constitute terminal systems in a conventional configuration, become intermediate systems. They constitute nodes of the virtual networks $SVN_1$ through $SVN_n$ and also nodes of the "real" network, i.e., the Internet or intranet subnetwork $SR_x$. The systems act as gateways that interconnect the nodes of the virtual networks $SVN_1$ through $SVN_n$ to the subnetwork $SR_x$. Each system is also provided with an IP address.

Figure 6:
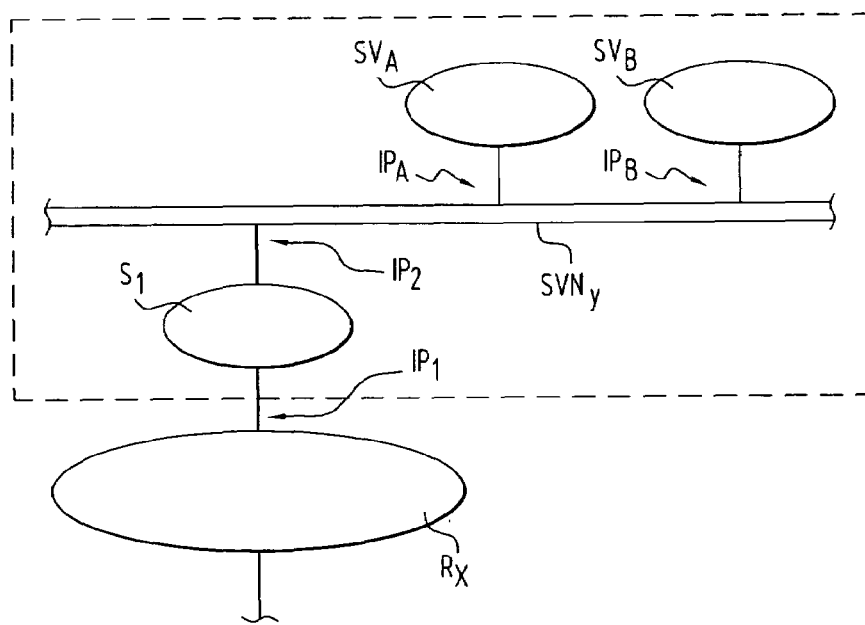

A system virtual network $SVN_1$ associated with a system $S_1$ can be represented as illustrated by FIG. 6. It may be seen that a system $S_1$ clearly constitutes a node for the network $R_x$, and that it is associated, seen from this network (i.e., from the outside), with a first address $IP_1$, with @$IP_1$: X, $X_1$, Xbeing the prefix assigned to the subnetwork $SR_x$ and $X_1$ being the address of $S_1$ in the subnetwork $SR_x$.

It is assumed that the system virtual network $SVN_y$ is constituted by two servers referenced $SV_A$ and $SV_B$, which it hosts, and by the system $S_1$ per se. Seen from the system virtual network $SVN_1$, the system $S_1$ is associated with a second address: $IP_2$, with @$IP_2$: Y, $Y_1$, Y being the prefix assigned to the system virtual network $SVN_y$, and $Y_1$ being the address of $S_1$ in the network $SVN_y$.

Likewise, the servers $SV_A$ and $SV_B$ are associated with two addresses, $IP_A$ and $IP_B$, respectively, with @$IP_A$: Y, $Y_A$, and @$IP_B$: Y, $Y_B$, $Y_A$ and $Y_B$ being the addresses of $SV_A$ and $SV_B$, respectively, in the network $SVN_y$.

For a more detailed description of the addressing mechanism, it may be beneficial to refer to the aforementioned French patent application, particularly to FIG. 4 of this application, which illustrates in detail the architecture of a real system that allows the aforementioned addressing.

In the context of the invention, the servers $SV_A$ and $SV_B$ can be constituted by the WAP 30 and web 31 servers of FIG. 3, the real system $S_1$ in this case being the server system 3.

The addressing method according to the aforementioned French patent application, like the method according to the invention, is compatible with the most commonly used Internet protocol today, i.e. the IPV4 version. However, an address that conforms to this protocol includes only four bytes, or $2^{32}$ theoretical addresses, in reality less due to the hierarchical structure mentioned above. Because of the rapid growth of the Internet, projections into the future have shown that this limited address space will quickly result in a shortage. Being able to address entities in a system directly, and according to one of the characteristics of the invention, to assign them permanent addresses, multiplies the number of distinct addresses needed. Also, in the context of the invention, the IPV6 protocol is preferred for assigning permanent addresses. The theoretical address space is thereby greatly increased: approximately $6.65 \times 10^{23}$ network addresses per square meter of the surface of the earth.

As indicated above, according to a characteristic of the invention, transmissions are secured from end to end, in a way that is transparent vis-à-vis the various protocols: WAP, web or other. In a preferred embodiment, the protocol known as IPSec is adopted, which protocol is mandatory if the IPV6 version is used for transmissions through the Internet.

Figure 7:
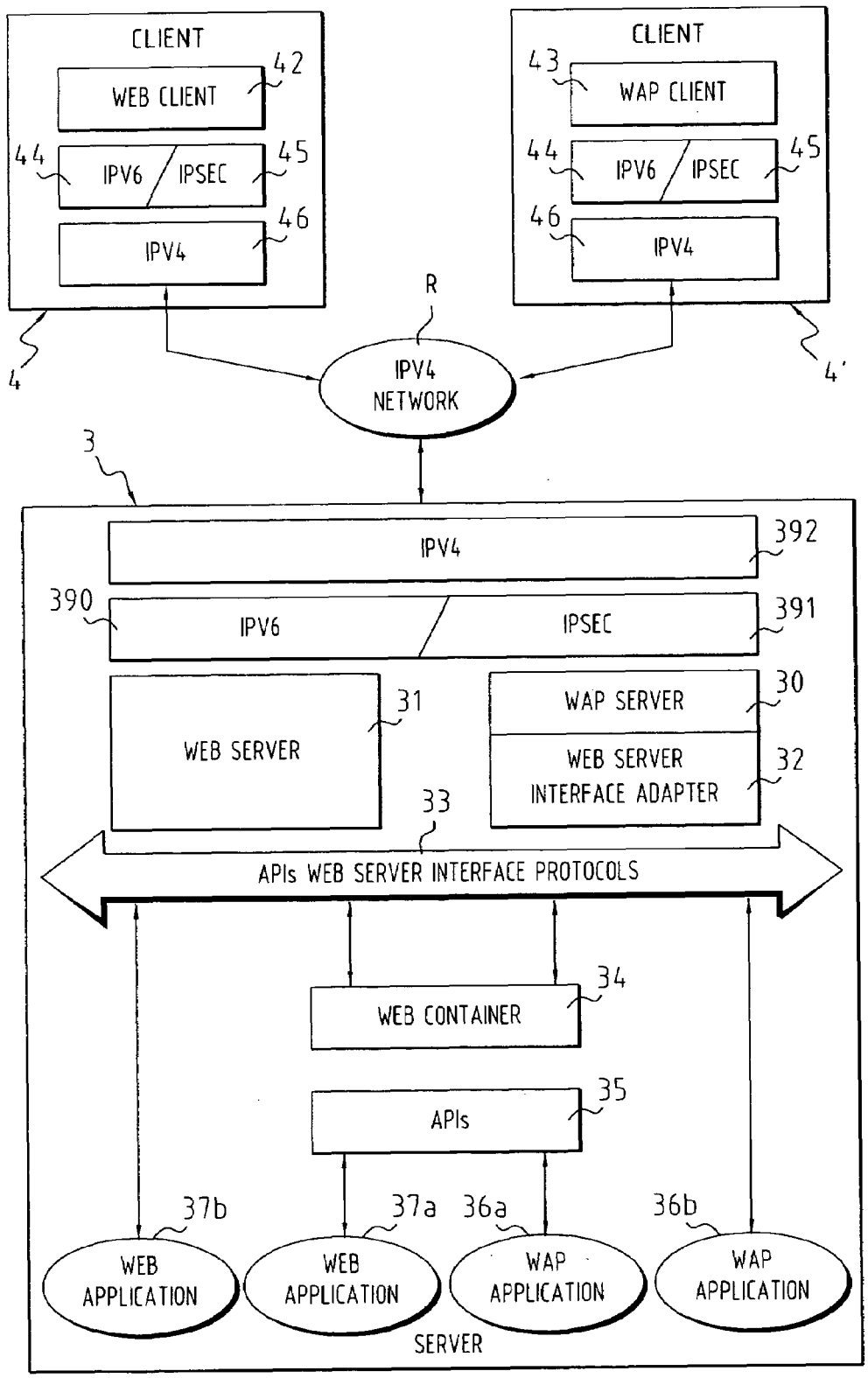
FIG. 7 illustrates in greater detail the interconnection of two entities in the system of FIG. 2.

FIG. 7 schematically illustrates an exemplary architecture of a transmission system 2 according to the invention, which shows the interconnection between two client type entities, referenced 4 and 4', and a server type entity 3. The client 4 or 4' is constituted by one of the devices represented in FIG. 2: 20, 24, 26 or 28. The two entities, 3 and 4 or 4', communicate with one another via one or more of the networks of FIG. 2 with the overall reference R. The entity 4 is a client of the web type and the entity 4' is a client of the WAP type.

It is assumed that the IPV4 protocol is used for the transmissions, which is generally the case at the present time. The addressing method illustrated in reference to FIGS. 5 and 6 and the method according to the invention are compatible with internet networks, as mentioned above. In the context of the invention, a protocol called "6-to-4" is implemented, which converts the IPV6 addresses into IPV6-compatible IPV4 addresses, and vice versa.

According to the method of the invention, in each physical system, a communication protocol stack is implemented, successively comprising an IPV6 stack 390 or 44, which includes the IPSec security protocol 391 or 45, and an IPV4 stack 392 or 46, respectively for the server 3 and the clients 4 or 4'. The IPV4 stacks 392 and 46 are interfaced with the network R. The IPV6 stacks 390 and 44 are interfaced with the WAP 30 and web 31 servers on the server 3 end, and with the WAP 42 and web 43 clients on the client 4 end.

FIG. 7 also details the application layers of the client 4, which have a high degree of symmetry with those of the server 3. The clients 42 and 42' can be constituted by browsers. Security associations are defined between users or client applications and server applications. Advantageously, a "triplet" identifies each security association:

a destination address for the data packets;
  a security protocol, preferably the protocol known as "ESP" ("Encapsulating Security Payload"), is used in tunnel mode; and
  a security parameter index (or "SPI").

It is clear that in the securing of the transmissions, because of the fact that the encryption and decryption is performed upstream from the IPV4 address layers in each entity to be placed in communication, the desired transparent protection is obtained from end to end. It is clear that there is no longer a security loophole during the routing of the data, even if a segment of the network is of the wireless transmission type.

Figure 8:
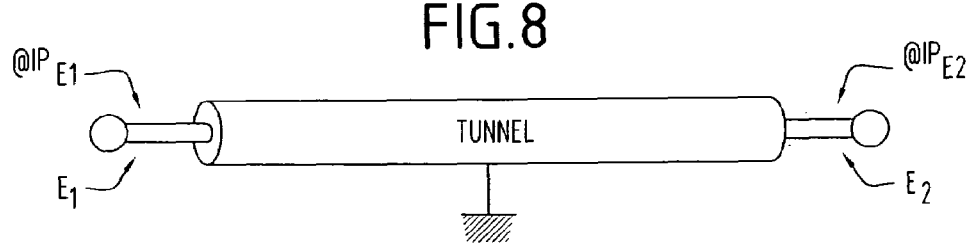
FIG. 8 schematically illustrates a secure link of the so-called "tunnel" type obtained by the method according to the invention.

The schema equivalent to the architecture represented in FIG. 7 is that illustrated by FIG. 8. The transmission channel can essentially be represented symbolically in the form of a shielded cable or "tunnel" that links two entities, arbitrarily referenced $E_1$ and $E_2$, to which the respective permanent addresses $@IP_{E1}$ and $@IP_{E2}$ have been assigned. They are either IPV6 addresses or IPV6-compatible addresses if the network is in the IPV4 protocol.

For example, a secure tunnel is established between a WAP terminal, for example the mobile telephone 20 (FIG. 2) and the server 3 hosting a WAP application 33. Generally, the tunnel transports IPV6 communications from end to end between a user and an application.

Naturally, if the network R is in the IPV6 protocol, the address conversions are no longer necessary and the IPV4 stacks 392 and 46 do not exist.

When the connected station is mobile, the protocol known as "mobile IPV6" is used. The mobile station is associated at all times with a temporary address that remains transparent for the users wishing to address the entity associated with this station. A dialog is initialized with a device of the aforementioned "home agent" type (FIG. 2: 23). The latter establishes a correlation between the assigned permanent address and the temporary address. This provision makes it possible to obtain what has been referred to above as "macromobility."

The aforementioned dialog is secure. Preferably, the authentication mechanism specific to IPSec is implemented as recommended by the "mobile IPV6" protocol.

Communications between users and applications are obtained with the implementation of the following IPSec services, if they are selected:

authentication of the data source, including the authentication of the user;
    integrity; and
    confidentiality.

More precisely, the authentication of the users is advantageously done by means of the permanent address that is assigned to them. The users are stored in an electronic directory. For example, the organization known as "ETF" ("Internet Engineering Task Force") has proposed a directory standard that can be qualified as "lightweight," known as "LDAP" ("Lightweight Directory Access Protocol"). A subscriber profile and possible privileges are associated with the user. Since IPSec is used with the ESP mechanism in tunnel mode (FIG. 8), an authentication of the information source (a permanent IPV6 address), in this case the identification of the user, is present in each data packet and encrypted. In addition, the data source is authenticated, and in this case represents the user. This identification is used to build a security context, which is itself used by the application or, better, by the container of the application, to perform an access control for authorization controls.

To illustrate the concept, we will now describe an exemplary architecture of a transmission system implementing the provisions of the invention, adapted to a secure mobile merchant application, using a segment of a packet radio transmission network, for example of the GPRS type.

Figure 9:
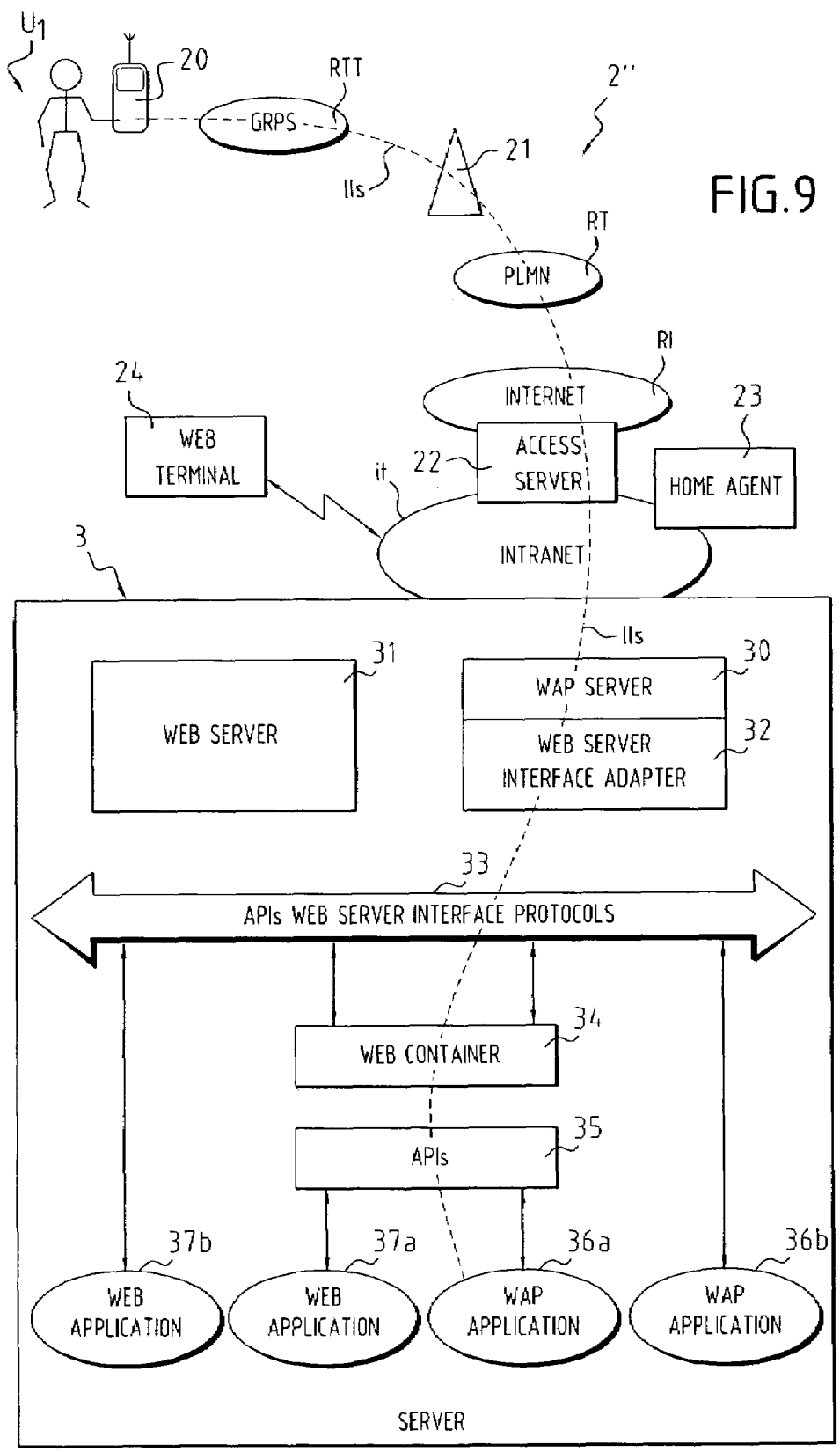
FIG. 9 illustrates an exemplary architecture of a system for secure communication via an internet network for a merchant application in so-called WAP technology.

FIG. 9 schematically illustrates an architecture of this type, referenced 2". The elements in common with the preceding figures have the same references, and will be re-described only as necessary.

As before, the system 2" overall comprises mobile terminals, only one of which 20, under the control of the user $U_1$, is illustrated. This mobile terminal 20 is connected to the segment of the wireless network RTT then, via the gateway 21 to the public global network RT, to the Internet RI. A server, for example like 3 in FIG. 3, hosting at least one merchant application, for example the application 36a, in WAP technology, is connected to the Internet via the intranet it and the access server 22. A web terminal 24 connected to the intranet it is also represented. This terminal is similar to the station 24 of FIG. 2.

The address protocol and IPSec stacks (see FIG. 7) make it possible to assign IPV6 addresses and perform the operations required by the IPSec protocol.

The architecture just described makes it possible to establish a logical link lls between the user $U_1$ and the WAP merchant application 36a that is secure from end to end, despite the fact that it uses a wireless network segment.

Through the reading of the above, it is easy to see that the invention achieves the stated objects.

It should be clear, however, that the invention is not limited to just the exemplary embodiments explicitly described, particularly in connection with FIGS. 2 through 9.

The applications of the invention are not limited to the field of "secure electronic commerce" alone. They also cover banking and medical applications, and more generally any application implementing communications that pass through an internet network, particularly wherein at least one segment is constituted by a wireless transmission network While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

I claim:

1. A method for secure communication between first and second entities interconnected via an internet network, said entities being associated with respective first and second processing systems connected to said internet network, said first system operating in client mode and said second system operating in server mode, said method comprising:

assigning respective permanent internet addresses to said first and second entities,
  making at least one application, located in said second system, accessible to said first entity,
  receiving an application request at the second system, selectively recognizing said application request as belonging to one of a first and a second application interface communication protocol, said first application interface communication protocol associated with a first server of the second system and said second application interface communication protocol associated with a second server of the second system, providing said application request recognized as belonging to the first application interface communication protocol to the first server of the second system, providing said application request recognized as belonging to the second application interface communication protocol to the second server of the second system, converting, using a web server application interface portion of the second server, said application request recognized as belonging to the second application interface communication protocol to the first application interface communication protocol, encrypting data exchanged between said first and second entities in conformity with a desired security protocol, wherein said first and second systems include including a communication protocol stack having at least one layer which allows for said encrypting step to be performed and said second entity hosting a WAP gateway utilizing the web server application interface said second system is being configured to communicate, via the web server application interface adapter, directly with a first type of WAP application and via a web container and at least one specific application program interface with a servlet WAP application, and performing a conversion to or from HTTP using a WAP gateway function included in the second system.

2. A method according to claim 1, wherein said permanent IP addresses assigned to said first and second entities conform to an IPV6 Internet address protocol.

3. A method according to claim 2, wherein communications through said internet network take place in conformity with an IPV4 Internet address protocol, and wherein said method further comprises:

executing, in at least one of said first and second systems, an address conversion step which includes converting said IPV4 internet address protocol to said IPV6 internet address protocol.

4. A method according to claim 1, wherein said encrypting step is performed in conformity with an IPSec protocol in tunnel mode, in order to obtain secure data exchanges between said first and second entities, and wherein said IPSec protocol is used with an EPS mechanism for authenticating information sources.

5. A method according to claim 4, wherein said first entity is a user of said first system, wherein said method further includes a step for authenticating said user, and wherein said permanent IP address assigned to said first entity is used to identify said user.

6. A method according to claim 5, wherein communications through said network take place in data packet mode, and wherein said permanent IP address identifying said user is present in encrypted form in conformity with said IPSec protocol, in each of said data packets.

7. A method according to claim 1, wherein said first system is connected to a wireless transmission segment, wherein communications between said first system and said second system take place in conformity with a WAP protocol, and wherein said second system includes a WAP server and a unified interface between said WAP server and at least one application, said at least one application being located in said second system and being accessible by said first entity, and wherein said WAP server is integrated into said second system as a web server.

8. A method according to claim 7, wherein said second system includes an additional module for performing two-way interface adaptation of structures, which makes it possible to support application interfaces used by web servers.

9. A method according to claim 7, wherein said first system includes a WAP browser.

10. A method according to claim 1, wherein said first system includes a mobile system, wherein said method further includes assigning to said first system a temporary address, and initiating a dialog between said first system and a home agent connected to said internet network to correlate said permanent address assigned to said first entity with said temporary address, in conformity with said IPV6 protocol.

11. A system architecture for secure communication between first and second entities interconnected via an internet network, said entities respectively being associated with first and second data processing systems within a set of distributed systems connected to said internet network, said first system operating in client mode and said second system operating in server mode, said first and second entities being associated with permanent internet addresses, comprising:

at least one application included in said second system, said at least one application being accessible by said first entity;

first and second communication protocol stacks respectively included in said first and second systems, a first application interface communication protocol associated with a first server of the second system, a second application interface communication protocol associated with a second server of the second system, said second server comprising a web server application interface portion configured to convert an application request belonging to the second application interface communication protocol to the first application interface communication protocol, each of said first and second communication protocol stacks comprising at least one address layer using a respective one of said permanent TP addresses and a logical layer for encrypting, in end-to-end mode in conformity with a given security protocol, data exchanged between said first and second entities and said second entity hosting a WAP gateway utilizing the web server application interface adapter and the server included in said second system being configured to communicate, via the web server application interface adapter, directly with a first type of WAP application and via a web container and at least one specific application program interface with a servlet WAP application, and a WAP gateway function included in the second system to perform a conversion to or from HTTP.

12. An architecture according to claim 11, wherein said address layer conforms to an IPV6 protocol.

13. An architecture according to claim 12, wherein said internet network conveys data packets in conformity with an IPV4 protocol, wherein each of said first and second communication protocol stacks includes a first address layer in the IPV6 protocol and a second address layer in the IPV4 protocol from which IPV6-compatible addresses are derived, in order to obtain exchanges in tunnel mode, and wherein said logical layer in each of said first and second communication protocol stacks encrypts data packets exchanged between said first and second entities.

14. An architecture according to claim 11, wherein said logical layer in each of said first and second communication protocol stacks conforms to an EPSec protocol in tunnel mode, in order to obtain secure data exchanges between said interconnected first and second entities, and wherein said IPSec protocol is used with an EPS mechanism for identifying information sources.

15. An architecture according to claim 11, wherein said first system is connected to a wireless transmission segment, communications between said first system and said second system take place in conformity with a WAP protocol, said second system includes at least a first module constituting a WAP server and a second module forming a unified interface between said WAP server and said at least one application, and said WAP server is integrated into said second system as a web server.

16. An architecture according to claim 15, wherein said second system includes at least one additional module for two-way conversion of data packets of structures in conformity with web or WAP protocols.

17. An architecture according to claim 15, wherein said first system is a mobile telephone terminal operating in a GSM standard, said mobile telephone terminal including a WAP type browser constituting a client and a display screen for displaying pages in WML-type language.

18. An architecture according to claim 15, wherein said first system is a mobile telephone terminal operating in a GPRS standard, and wherein said mobile telephone includes an Internet browser constituting a client and a display screen for displaying pages in WML-type language.

* * * * *

UNITED STATES PATENT AND TRADEMARK OFFICE
CERTIFICATE OF CORRECTION

PATENT NO. : 7,275,262 B1 Page 1 of 1
APPLICATION NO. : 10/048057
DATED : September 25, 2007
INVENTOR(S) : Michel Habert It is certified that error appears in the above-identified patent and that said Letters Patent is hereby corrected as shown below:

Please correct the filing date of the PCT to read as follows:

--(22)  PCT Filed -- May 22, 2001--

Column 15, Line 11, replace the word "EPSec" with the word --IPSec--.

Column 16, Line 19, insert the word --terminal-- after the word "telephone".

Signed and Sealed this

Twenty-fifth Day of December, 2007

JON W. DUDAS
*Director of the United States Patent and Trademark Office*